United States Patent
Sferro et al.

(10) Patent No.: US 6,230,066 B1
(45) Date of Patent: May 8, 2001

(54) SIMULTANEOUS MANUFACTURING AND PRODUCT ENGINEERING INTEGRATED WITH KNOWLEDGE NETWORKING

(75) Inventors: Peter Richard Sferro, Rochester; Gregory John Burek, Plymouth; Sean Bogue O'Reilly, Farmington, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/149,749

(22) Filed: Sep. 8, 1998

(51) Int. Cl.[7] .................................................. G06F 19/00
(52) U.S. Cl. .............................. 700/104; 700/96; 700/98; 700/103; 700/105; 700/49; 700/50; 716/1; 716/3; 345/420; 345/427; 345/419; 703/1; 703/13; 703/14
(58) Field of Search ................................ 700/48–50, 95, 700/96, 97, 98, 99, 100, 101–105, 118, 163, 183, 184, 185; 703/1, 13, 14; 716/1–4; 345/419, 420, 421, 427; 359/458; 382/154

(56) References Cited

U.S. PATENT DOCUMENTS

| | | | |
|---|---|---|---|
| 5,208,765 | 5/1993 | Turnbull | 700/97 |
| 5,257,363 * | 10/1993 | Shapiro et al. | 703/13 |
| 5,307,261 | 4/1994 | Maki et al. | 700/95 |
| 5,355,317 | 10/1994 | Talbott et al. | 700/97 |
| 5,357,440 | 10/1994 | Talbott et al. | 700/97 |
| 5,640,337 * | 6/1997 | Huang et al. | 703/23 |
| 5,748,943 * | 5/1998 | Kaepp et al. | 703/1 |
| 5,752,000 * | 5/1998 | McGeer et al. | 703/14 |
| 6,088,689 * | 7/2000 | Kohn et al. | 706/10 |

* cited by examiner

*Primary Examiner*—William Grant
*Assistant Examiner*—Ramesh Patel
(74) *Attorney, Agent, or Firm*—Joseph W. Malleck

(57) ABSTRACT

Method of simultaneously carrying out manufacturing and product engineering integrated with knowledge networking. The method comprises: (a) creating a logic modeller by (i) identifying elements of an engineering project and syntactically arranging such elements in a logic sequence based on engineering functions, (ii) ascertaining uniform meaning for such elements and engineering functions to allow for interdisciplinary communication, (iii) gathering existing knowledge pertinent to such elements and engineering functions, and encoding such gathered knowledge into terms according to uniform meanings, and (iv) programming a computer memory template with such logic sequence and with attached data bases of such encoded existing knowledge; and (b) operating said logic modeller through a direct engineer that: (i) requests review of initial input specifications of an inchoate design that results in an analysis by the modeller to indicate rule or constraint violations of the gathered knowledge, and (ii) interacts with the analysis in response to such indications to converge on acceptable or improved engineering design functions.

15 Claims, 9 Drawing Sheets

SIMULTANEOUS MANUFACTURING AND PRODUCT ENGINEERING INTEGRATED WITH KNOWLEDGE NETWORKING

TECHNICAL FIELD

This invention relates to the technology of revising computer assisted engineering designs based on learned information, and more particularly to systems for rapidly bringing together the collective engineering intellect of one or more engineering organizations on a specific engineering project.

DISCUSSION OF THE PRIOR ART

State of the art engineering is today usually carried out by first generating a concept drawing of a part, or system of parts, that are to be manufactured. Such concept drawing can be generated with some degree of speed by use of computer aided design (CAD) in sequence with computer aided manufacturing. The drawing is reviewed and analyzed by individuals having differing engineering disciplines (e.g., metallurgy, stress analysis, environmental impact, etc.) usually independent of each other with little interaction. Further changes to the CAD drawing are subsequently made either as a result of field experience with physical specimens of the part or system, or as a result of cost analyses of the part or system. But the geometry of the drawing, the common denominator, is the focus for the continuum of engineering and review that massages the design to its final conclusion. This continuum is time consuming (although speeded by computer assistance); there is no assurance that the engineering work will not be duplicative of what is already available at existing facilities. It further does not insure that mistakes made with similar designs will not be repeated or that known constraints of the manufacturing facility will be observed. What is lacking is a process by which not only the scientific principles of all disciplines that bear on the engineering project, along with engineering and business history or constraints of similar engineering projects, can be revealed to a new type of "direct engineer" who will also be provided with alternative solutions to signaled problems. The direct engineer will be able to make design judgments and design iterations within a fraction of the time currently required, while producing a total final design that is much freer of errors.

SUMMARY OF THE INVENTION

The invention is a method of simultaneously carrying out manufacturing and product engineering integrated with knowledge networking. The method in its broadest aspect comprises the steps of: (a) creating a logic modeller by (i) identifying elements of an engineering project and syntactically arranging such elements in a logic sequence based on engineering functions, (ii) ascertaining uniform meaning for such elements and engineering functions to allow for interdisciplinary communication, (iii) gathering existing knowledge pertinent to such elements and engineering functions, and encoding such gathered knowledge into terms according to uniform meanings, and (iv) programming a computer memory template with such logic sequence and with attached data bases of such encoded existing knowledge; and (b) operating the logic modeller through a direct engineer that: (i) requests review of initial input specifications of an inchoate design that results in an analysis by the modeller to indicate rule or constraint violations of the gathered knowledge and (ii) interacts with the analysis in response to such indications to converge on acceptable or improved engineering design functions.

The gathered knowledge may include scientific and engineering rules, business information and prior engineering design history; the gathered knowledge may come from remote sources, such as suppliers, assembly plants, dealerships, repair shops, etc. Heuristic dialog between members of differing engineering and business disciplines is utilized during the identification of elements of an engineering project which allows for introduction of innovative elements or engineering functions, as well as provide for reorienting conventional thinking. The logic sequence may include consideration of backward scheduling.

Operating the logic modeller may start with selection of a points file in CAD and transporting such file into the modeller. Analysis by the modeller will present alternatives or suggested ways to overcome violations. If the first stages of interaction with the logic modeller does not result in a desired total product and manufacturing definition, the definition may be converted to a 3-D object for visual analysis so that the interactive step may be reiterated.

DETAILED DESCRIPTION AND BEST MODE

The logic modellers of this invention facilitate utilizing a process called "direct engineering." Direct engineering combines an engineering environment and a disciplined and integrated product and manufacturing engineering process. It provides efficient knowledge management and a delivery system to expedite product and manufacturing design decisions. It not only brings product and manufacturing together into a single unified process but automatically brings to the engineer existing designs used at remote locations that have already proven valuable and trouble-free. With this approach, as the product is designed, even as early as the initial design concept stage, manufacturing feasibility, cost and process planning will be included as part of the knowledge base for the design. The modeller utilizes unique interactivity between the direct engineer and the logic modeller to facilitate interactive decision making. The deliverable of the modeller is a total engineering definition, including drawings, manufacturing feasibility, cost, process planning and bills of material.

Figure 1:
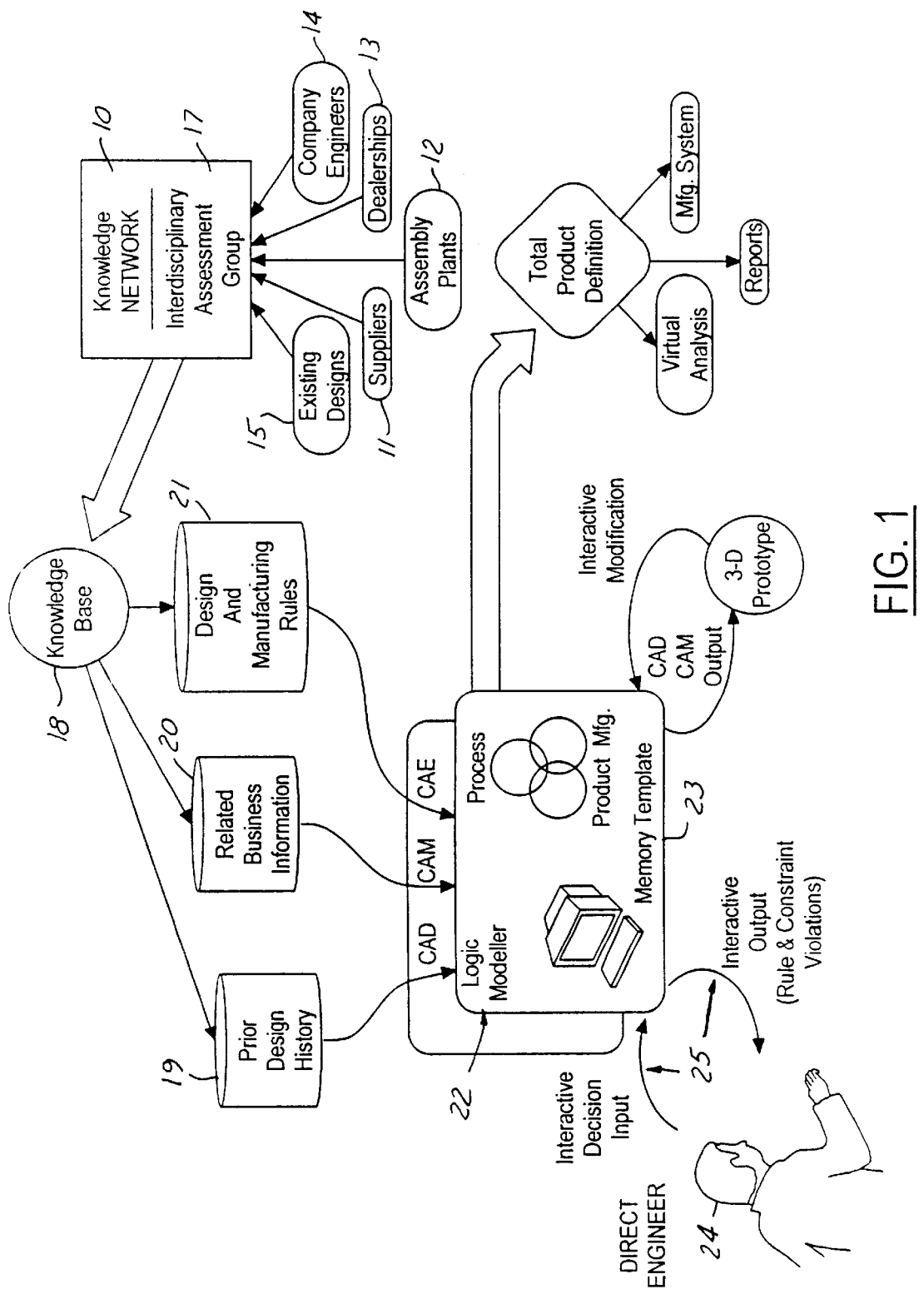
FIG. 1 is a schematic illustration of the flow and interrelationships of the process phases according to the present invention.

The broad aspect of the process comprises essentially two parts: first, creating a logic modeller 22 and, secondly, operating the modeller to create a specific engineering design definition. As shown in FIG. 1, a knowledge network 10 is set up whereby engineering and business information, related to a modeller's engineering sphere, is gathered from suppliers 11, assembly plants 12, automobile dealerships 13, company engineers 14, existing designs or bookshelved designs 15 and customer feedback. An interdisciplinary assessment group 17 (made up of personnel of varying scientific and business disciplines, such as concept engineering, product engineering, design engineering, process engineering, industrial engineering, material handling engineering, fixture and tool engineering, gauge engineering, etc.) is formed to review the gathered information, identify needed elements of the engineering project, and syntactically arrange the elements in a logic sequence based on engineering functions.

To facilitate the association of pieces of information into different parts of the logic sequence and promote communication with the remote sources of information, uniform meanings for the elements and engineering functions is ascertained by the group. The information is then encoded according to such meanings to populate data bases for the elements and engineering functions to form a knowledge base 18, made up of prior design history 19, related business information 20, and rules of design and manufacturing 21. The encoding can be to the lowest level of what will be understood by plant production personnel or may be encoded to even more sophisticated levels such as understood by scientific or university research laboratory personnel. Encoding allows for uniform capture of logic and information.

Lastly, the modeller 22 is created by programming a computer memory template 23 with the logic sequence and data bases carrying encoded knowledge. Considerable engineering science is embedded into the modeller 22, which can be the collective engineering intellect of an organization. It is most important that the knowledge be unique to an organization as revealed in its existing designs and manufacturing procedures, and form a basic and substantially permeating part of the modeller memory. Industry knowledge and world knowledge can be added to the degree the interdisciplinary group feels the information will be useful to the "direct engineer".

If new technology and information (new techniques, innovative elements, new scientific rules, innovative engineering functions, new materials, new cost factors, etc.) are to be introduced and made available for the "direct engineer" to utilize, such technology or information must be reviewed by the interdisciplinary group and subjected to heuristic dialog between members of the group to establish acceptability. Such dialog can reorient conventional thinking, but most importantly, will assure quality, accuracy and reliability of the knowledge, based on the group intellect.

In carrying out identification of the elements and forming the logic sequence, consideration may be given to backward scheduling of the sequence. The gathered information is not limited to the design of the elements for the part or assembly but can include associativity knowledge, such as gauging apparatus, or information as to surrounding objects or conditions that make up the package envelope for the part or system under consideration. In this way, a total engineering environment for the project is captured in memory.

Some rules may not be deemed implemented as yet (that is they are not prescriptive because insufficient knowledge is possessed as to how to implement the rule). Such rule then becomes an informative aid but is not prescriptive.

To operate the modeller, the engineer engages the modeller 22 in a session which guides the "direct engineer" 24 through a completely disciplined execution of all engineering logic for the design of the desired item. The modeller provides an interactive dialog 25 with the "direct engineer" relative to the effects of a proposed inchoate design, but evaluating it against all prior knowledge in the focused area. The "direct engineer" has choices at this point: (a) if the design matches a prior design or is within acceptable ranges with known durability, functionality, quality and cost, it can be released for production, or (b) a new design is created with all matching product and manufacturing elements.

Figure 2:
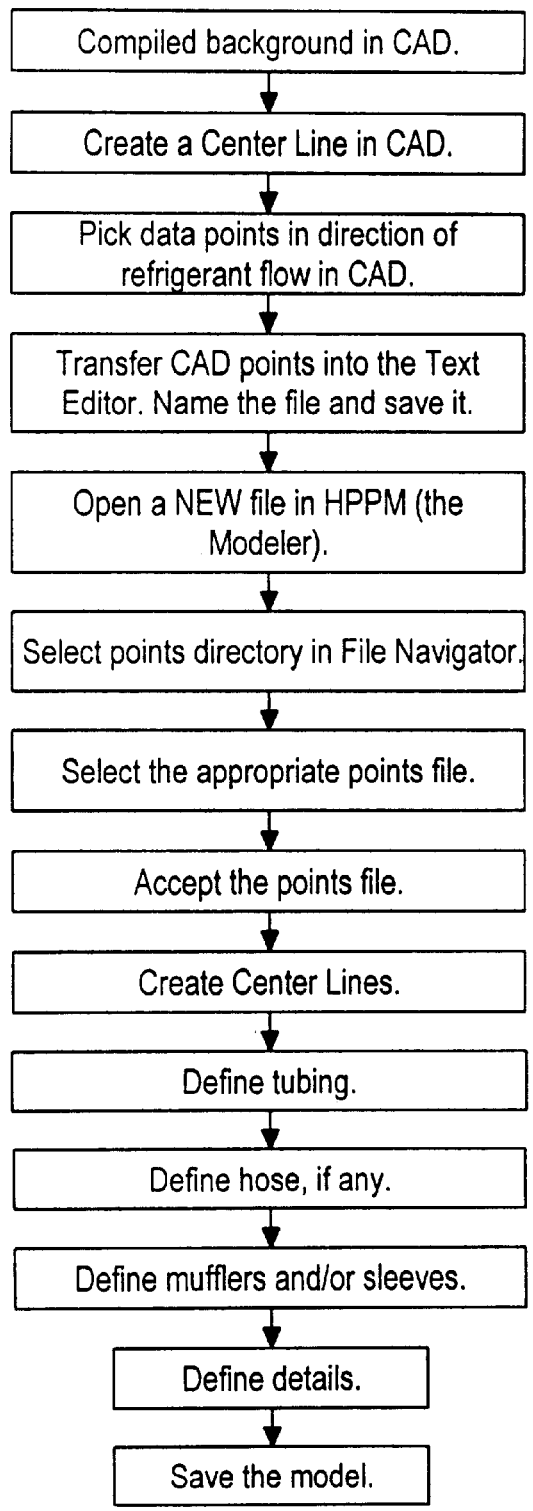
FIG. 2 is a flow diagram of the steps a "direct engineer" would use in preparing a hose assembly modeler.
Figure 5:
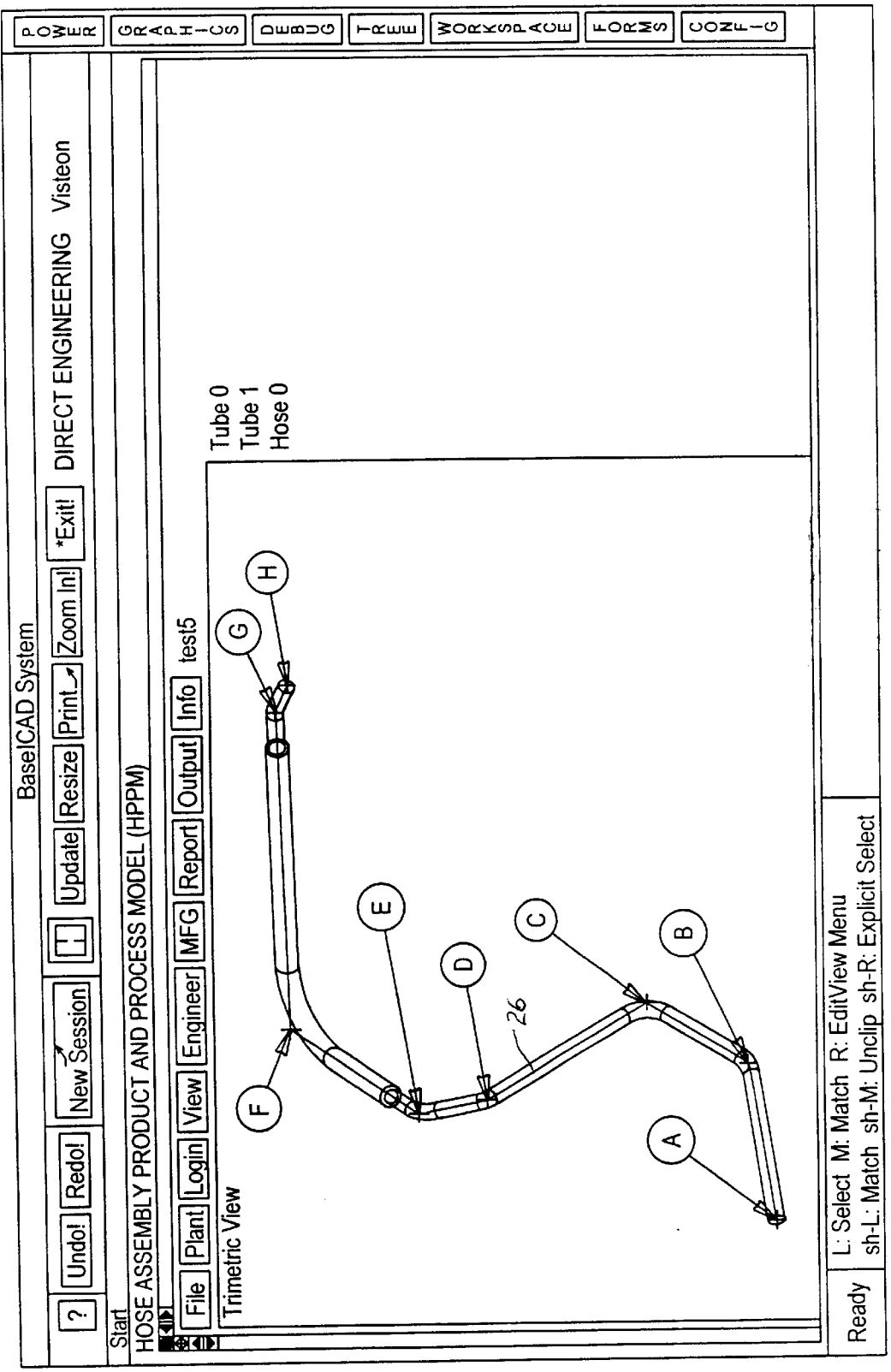
FIG. 5 is a monitor screen representation of the centerline tube segments and hose segments for one of the functional design projects using the hose assembly modeller.
Figure 6:
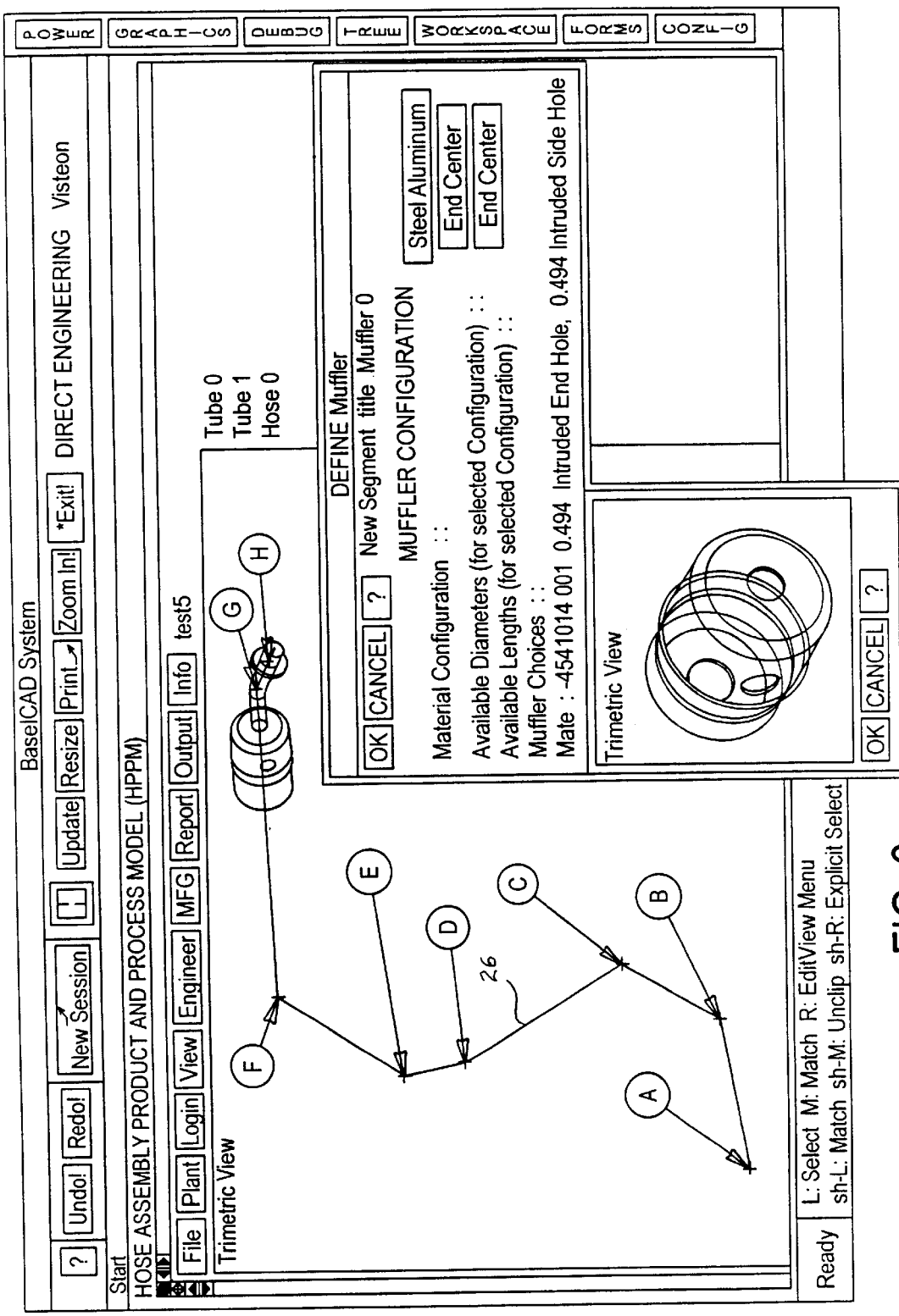
FIG. 6 is a screen representation of the muffler and sleeve details added to the functional design of FIG. 8.
Figure 7:
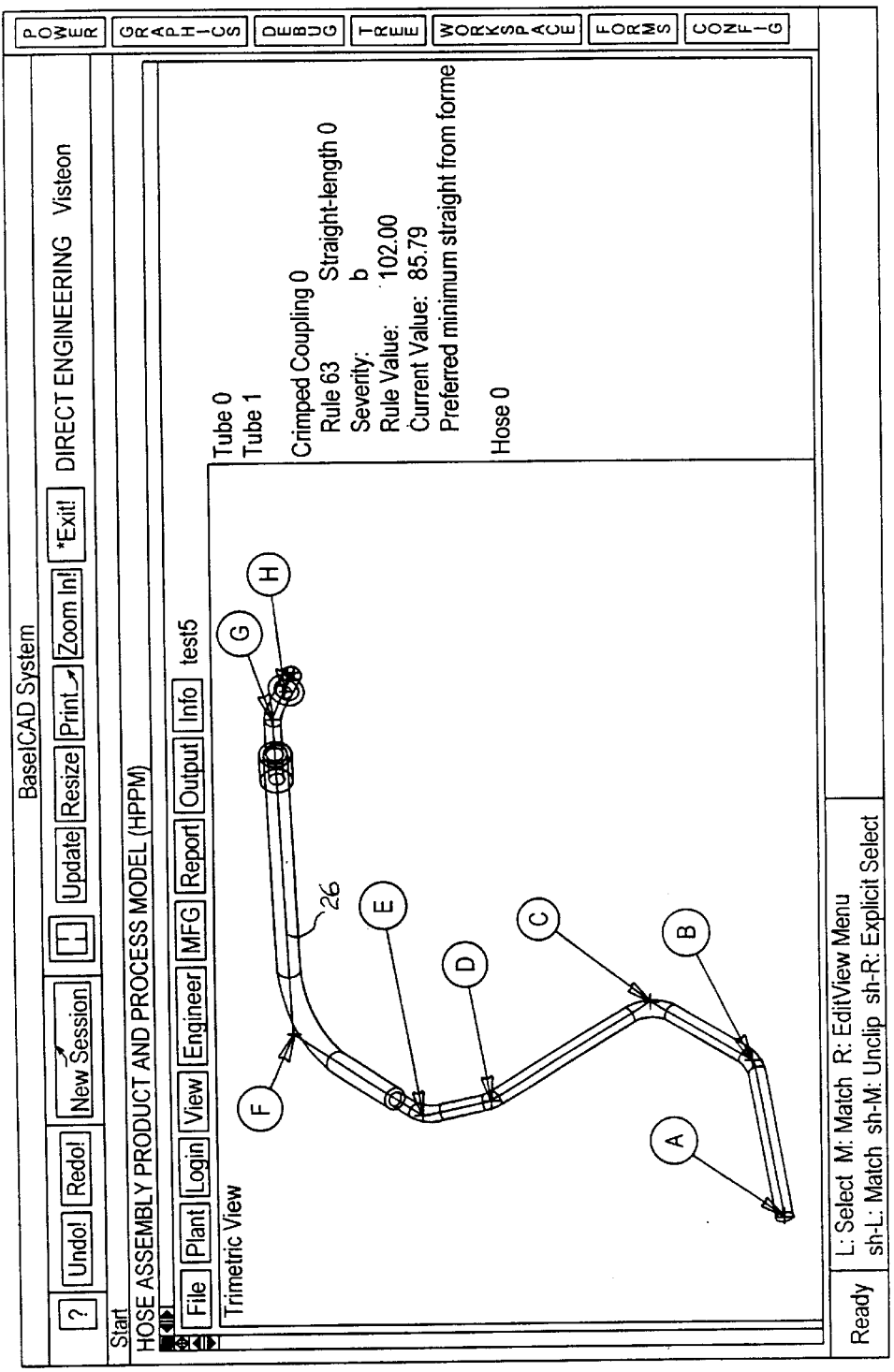
FIG. 7 is a screen representation of coupling details added to the functional design of FIG. 9.

As a preferred embodiment, the method of this invention shall be explained in connection with an automotive hose and assembly product and process modeller (HPPM) and the associated knowledge management process. The HPPM is created in accordance with the above steps to program a computer memory template with a logic sequence and with data bases for hose assembly products and process which have been encoded with pertinent existing knowledge. As shown in FIG. 2, the direct engineer starts with creating a routing points file in a CAD program. The direct engineer does so defining a centerline for the assembly using a wand that physically adopts points in space elected by the engineer as the wand is moved within a full scale package envelope for the assembly, or elects points on a computer screen in a sequence along the direction of refrigerant flow. The routing points define a centerline 26 (such as shown in FIGS. 5–7) around which the model of the product or system can be designed. The CAD points file is then imported into the modeller 22 and opened. The basic sequence of steps of the HPPM are further outlined in a flow diagram of FIG. 2.

Figure 3:
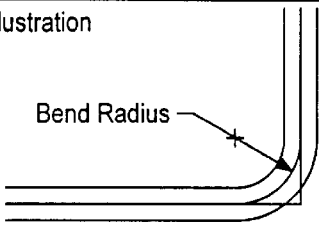
FIG. 3 is a more detailed view of rule usage in the modeller and how encoding is used.

The HPPM utilizes a knowledge base comprising rules and data bases and history for each element of the hose assembly product and process project. There may be many different types of one element, such as shipping caps; this is of course due to the many different tube sizes, male or female configurations, and styles of caps that can be used or needed. FIG. 3 shows a rule advisory screen that is presented when the "direct engineer" is attempting to define and detail a bend in the tubing. In this screen, the engineer is reminded that the maximum allowable bend radius for the type of tubing selected is 57 mm., based on quality considerations due to the need for special tooling if exceeded.

Figure 4:
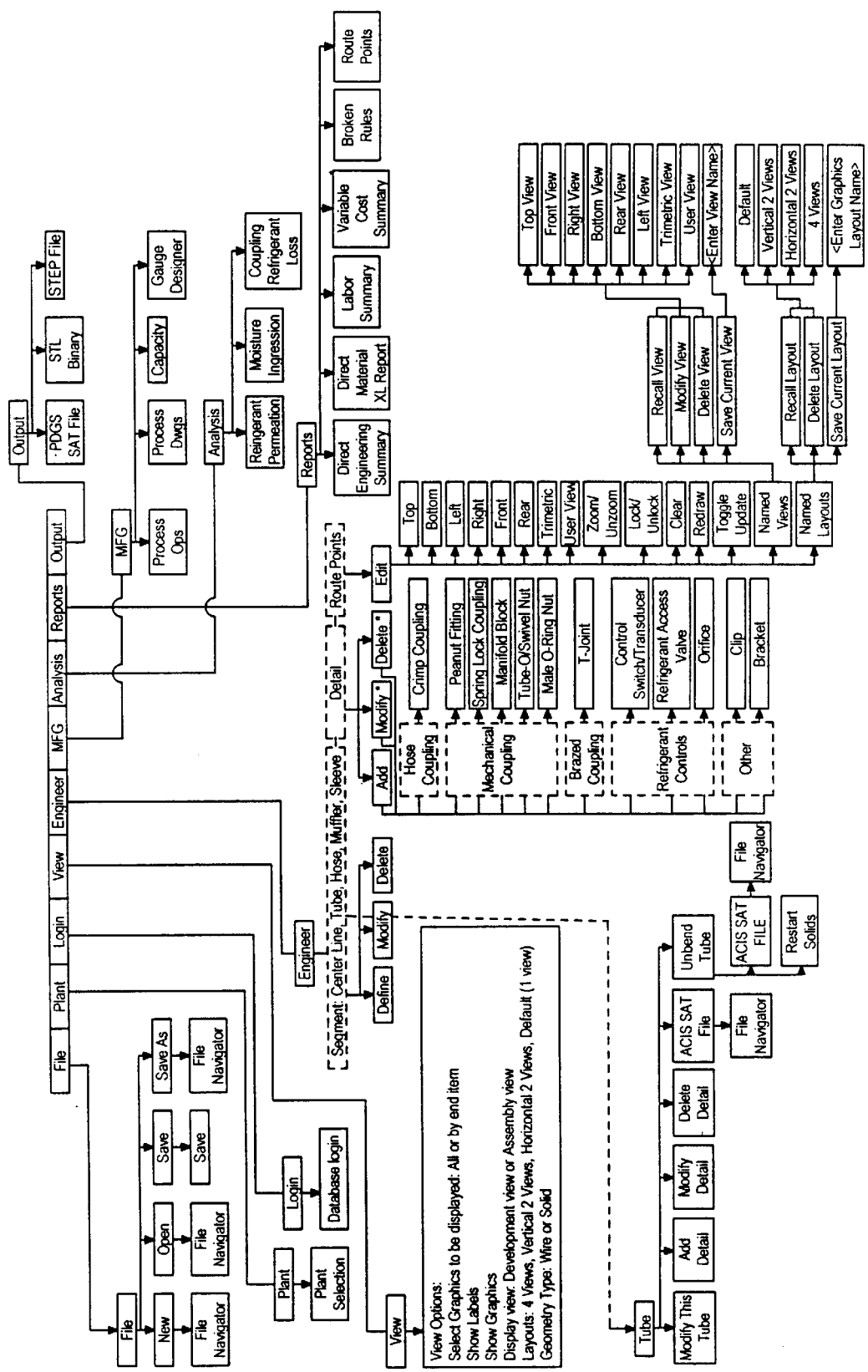
FIG. 4 is a tool bar and menu selections programmed for the hose assembly modeller.

Returning now to the stage at which the direct engineer has opened the points file in the HPPM, the direct engineer now proceeds to follow its logic sequence, as partly shown by the tool bar for the modeller progression in FIG. 4. Tubes or hoses are selected for each segment of the centerline where they are to be used (see FIG. 5). Mufflers and sleeves, as required, are also selected and placed (see FIG. 6). Then, couplings, joints, valves, clips or brackets are detailed by selection from the data base and located (see FIG. 7 for screen visualization and FIG. 4 for a menu of such detailing).

Figure 8:
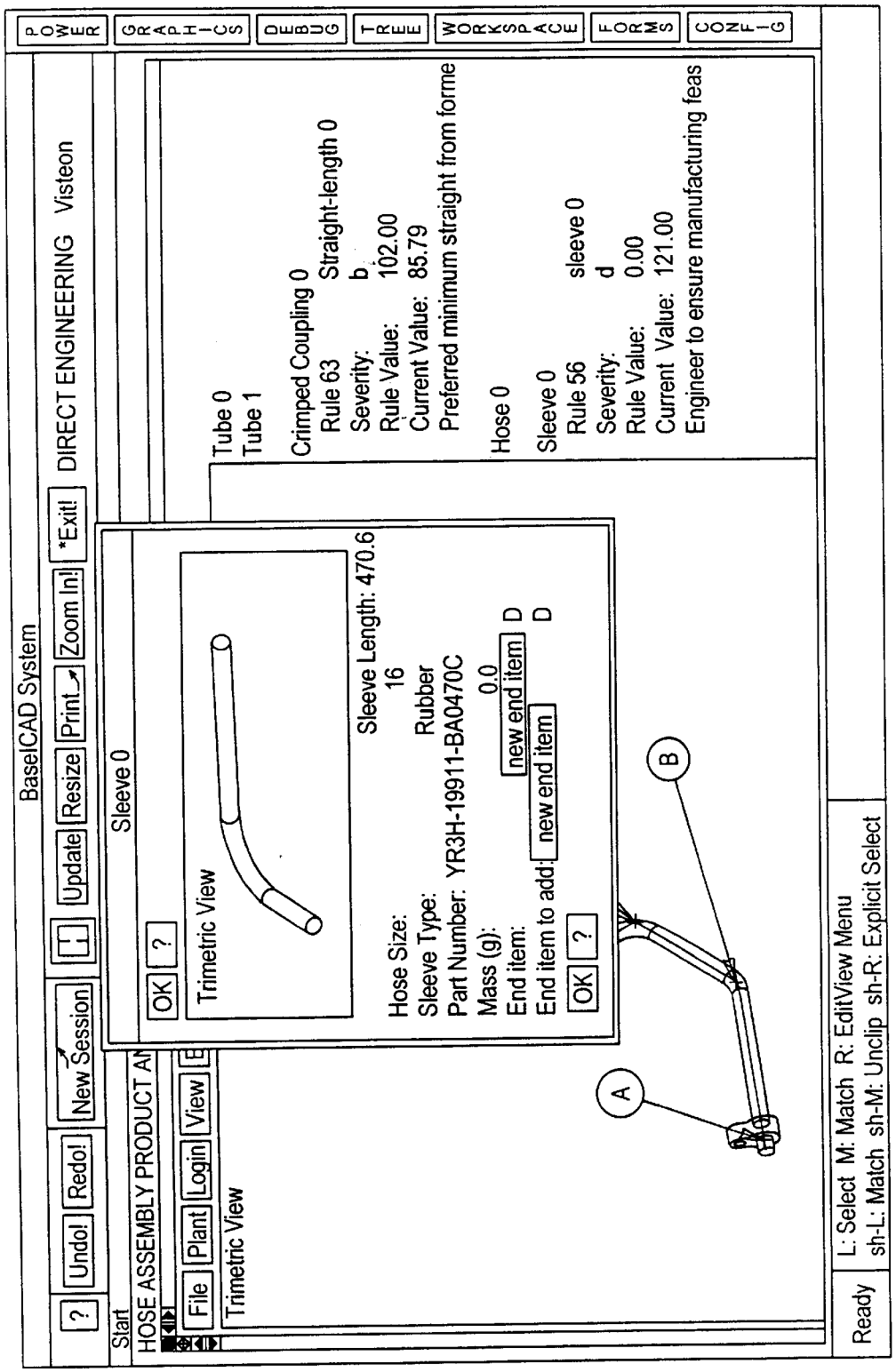
FIG. 8 is a screen representation showing a rule or constraint violation as the "direct engineer" requests the modeller to review an inchoate design.

At each instance of selection and definition by the direct engineer, the computer is asked to review and analyze the initial input specifications of the inchoate design; the modeller will indicate rule or constraint violations of the gathered knowledge base by a screen display, such as shown in FIG. 8 for rule violation. At each such detailing step, the direct engineer is given the opportunity to accept default selections or solutions, or overcome such selections based on the intuitive human knowledge of the direct engineer. They can be overcome by the direct engineer adopting alternative selections presented by the data base or adopting alternative ways to overcome the violation. This interaction between a human being and the modeller is essential to obtain the most appropriate and error-free functional design. A computer by itself cannot think; intervention by the "direct engineer" is essential to more quickly converges to an acceptable improved definition of the engineering design function. No matter how advanced, enlightened or detailed the engineering rules or manufacturing constraints are made, there is no substitute for interaction by the "direct engineer". The computer cannot by itself become a complete design engineer.

The underlying operating software enabling the HPPM was ICAD based upon the LISP language.

Before the final total product definition is reached, the direct engineer has the flexibility to interact with the developing inchoate design using a 3-dimensional prototype device that produces a physical specimen based on the modeller design file. In this way, the direct engineer can survey and further analyze the physical full sized product to see how it may function with associated elements or assemblies, and thus make other changes by modifying the design file (see FIG. 1).

Figure 9:
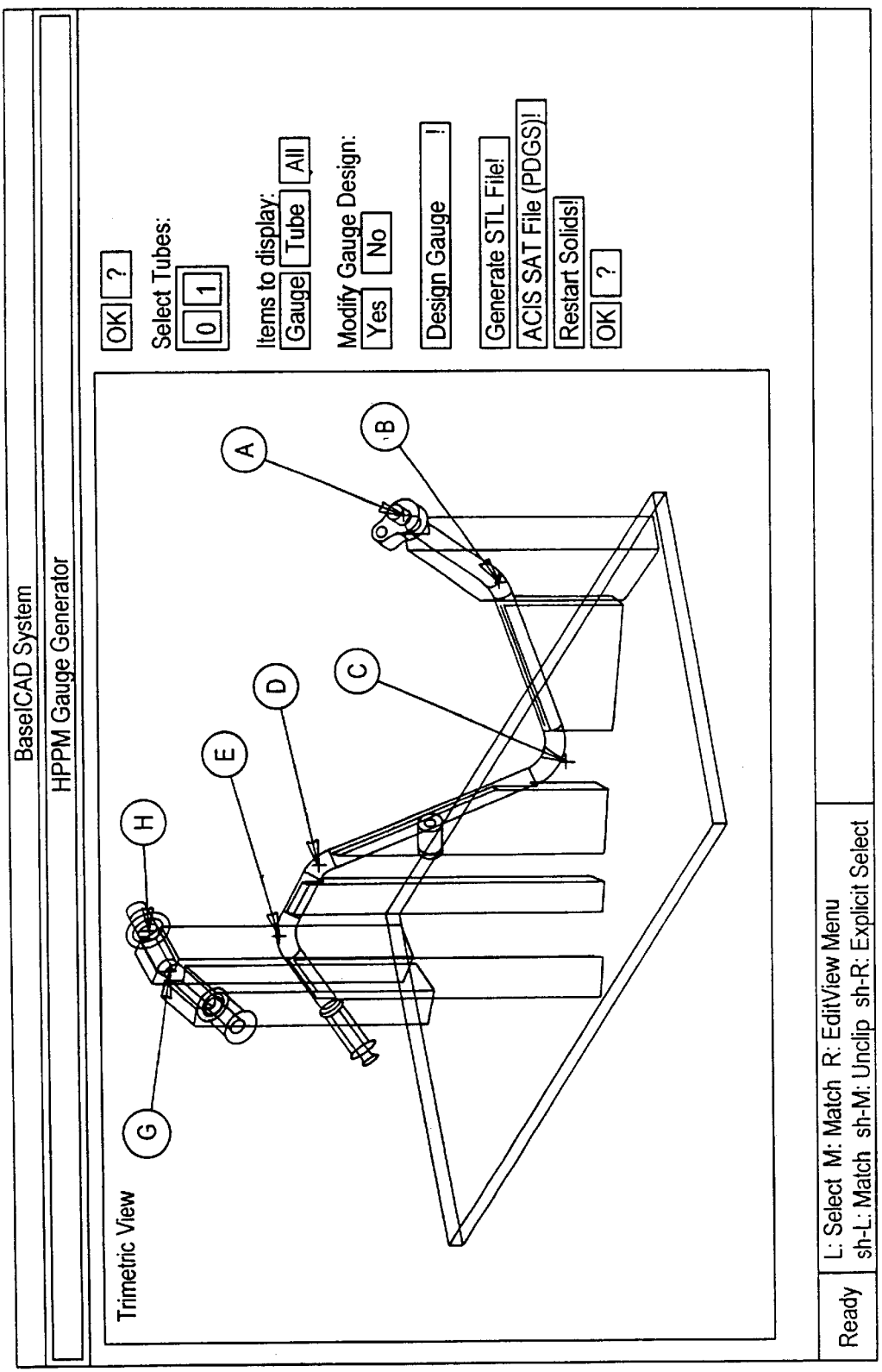
FIG. 9 is a screen representation showing how the modeller includes associativity knowledge (gauge).

Associativity may also be carried out "virtually" in the modeller by selecting the manufacturing menu to see, for example, how gauging is applied to the product (see FIG. 9 for visual screen display) or by selecting analysis to see how the product will fit in its package envelope or meet certain tests, such as refrigerant permeation, moisture ingression or coupling refrigerant loss.

The modeller finally provides for automatic reports to be disseminated for review of the thought pattern and eventual total product definition. These reports may comprise material lists, labor summary, cost analysis, broken rules, etc.

Use of the modeller has significantly reduced warranty costs because it embeds lessons learned and successful prior design solutions. It is a unified concurrent engineering process with integrated and seamless delivery of knowledge to rapidly create a total product definition. The computer program is "direct engineer centric" and provides an environment that allows the direct engineer to consider a vast knowledge base throughout the design, development, and manufacturing cycle.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. Method of simultaneously carrying out manufacturing and product engineering integrated with knowledge networking comprising:
   (a) creating a logic modeller by
      (i) identifying elements of an engineering project and syntactically arranging such elements in a logic sequence based on engineering functions;
      (ii) ascertaining uniform meaning for such elements and engineering functions to allow for interdisciplinary communication;
      (iii) gathering existing knowledge pertinent to such elements and engineering functions and encoding such gathered knowledge into terms according to uniform meanings; and
      (iv) programming a computer memory template with said logic sequence and with attached data bases of said encoded existing knowledge;
   (b) operating said logic modeller through a direct engineer that:
      (i) requests review of initial input specifications of an inchoate design that results in an analysis by said modeller to indicate rule or constraint violations of the gathered knowledge; and
      (ii) interacts with the analysis in response to said indications to converge on acceptable and improved definitions of engineering design functions.

2. The method as in claim 1, in which, in step (a)(iii), the knowledge includes scientific and engineering rules, business information and prior engineering design history.

3. The method as in claim 1, in which, in step (a)(iii), the gathering of knowledge is effective to capture a total engineering environment for the project to present a collective intellect of the related user and engineering community.

4. The method as in claim 1, in which, in step (a)(i), identification is carried out by heuristic dialog between members of differing engineering and business disciplines allowing for reoriented conventional thinking and the introduction of innovative elements or engineering functions.

5. The method as in claim 1, in which, in step (a)(i), the logic sequence may include consideration of backward scheduling.

6. The method as in claim 1, in which, in step (a)(iii), encoding is carried out to the lowest level understood by production plant personnel and allow for uniform capture of logic and information.

7. The method as in claim 1, in which, in step (a)(iii), the gathering of existing knowledge includes associativity knowledge.

8. The method as in claim 1, in which, in step (a)(iii), the gathered knowledge is taken from remote sources, such as suppliers, assembly plants, dealerships and repair shops.

9. The method as in claim 1, in which, in step (b)(i), the direct engineer inputs the initial specifications which may be routing points centerline, along with element on the centerline, or other elemental solids outline.

10. The method as in claim 1, in which, in step (b)(i), the analysis presents alternatives or suggested ways to overcome rule or constraint violations.

11. The method as in claim 1, in which, in step (b)(i), the analysis provides for reuse of prior designs and reuse of knowledge unique to the plant of an organization to thereby eliminate errors.

12. The method as in claim 1, in which, in step (b)(ii), the interaction may result in a definition that further includes visual display of manufacturing sequence, capacity or gauging.

13. The method as in claim 1, in which, in step (b)(ii), the direct engineer can overcome default selections by the modeller based upon the knowledge of the direct engineer.

14. The method as in claim 1, in which, in step (b)(ii), the definition of the engineering design function may further include virtual testing of the engineering design functions.

15. The method as in claim 1, in which the method further comprises a step (c), wherein reports are automatically created from the design definition which may include materials, lists, costs, labor and design or rule violations.

* * * * *